United States Patent
Okumura et al.

(10) Patent No.: US 11,154,929 B2
(45) Date of Patent: Oct. 26, 2021

(54) METAL POWDER MATERIAL

(71) Applicant: DAIDO STEEL CO., LTD., Nagoya (JP)

(72) Inventors: Teppei Okumura, Nagoya (JP); Koichiro Sekimoto, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 193 days.

(21) Appl. No.: 16/219,709

(22) Filed: Dec. 13, 2018

(65) Prior Publication Data
US 2019/0193151 A1   Jun. 27, 2019

(30) Foreign Application Priority Data
Dec. 26, 2017   (JP) ............... JP2017-248868

(51) Int. Cl.
| | |
|---|---|
| *B32B 5/30* | (2006.01) |
| *B22F 1/00* | (2006.01) |
| *B22F 1/02* | (2006.01) |
| *B33Y 70/00* | (2020.01) |
| *B22F 10/20* | (2021.01) |

(52) U.S. Cl.
CPC ............ *B22F 1/025* (2013.01); *B22F 1/0018* (2013.01); *B22F 1/0048* (2013.01); *B22F 1/0085* (2013.01); *B22F 1/0088* (2013.01); *B22F 1/02* (2013.01); *B22F 10/20* (2021.01); *B32B 5/30* (2013.01); *B33Y 70/00* (2014.12); *B22F 2301/052* (2013.01); *B22F 2301/40* (2013.01); *B22F 2304/054* (2013.01); *B22F 2304/10* (2013.01); *B22F 2999/00* (2013.01)

(58) Field of Classification Search
None
See application file for complete search history.

(56) References Cited

U.S. PATENT DOCUMENTS

| | | |
|---|---|---|
| 5,782,954 A | 7/1998 | Luk |
| 2001/0035069 A1 | 11/2001 | Arvidsson et al. |
| 2002/0189401 A1 | 12/2002 | Takaya et al. |
| 2005/0056347 A1 | 3/2005 | Takaya et al. |

(Continued)

FOREIGN PATENT DOCUMENTS

| | | |
|---|---|---|
| CN | 1387969 A | 1/2003 |
| CN | 102639650 A | 8/2012 |

(Continued)

OTHER PUBLICATIONS

Extended European Search Report dated May 28, 2019 for European Patent Application No. 18214032.7-1103.

(Continued)

*Primary Examiner* — George Wyszomierski
(74) *Attorney, Agent, or Firm* — McGinn I.P. Law Group, PLLC.

(57) ABSTRACT

The present invention relates to a metal powder material containing: metal particles having a particle diameter d10 of 10 μm or more and 100 μm or less; and nanoparticles containing a metal or a metal compound, in which the particle diameter d10 is a particle diameter at which an under-sieve cumulative fraction in a mass base distribution of particle diameter reaches 10%, and the nanoparticles are adhered to or mixed with the metal particles.

17 Claims, 10 Drawing Sheets

(56) References Cited

U.S. PATENT DOCUMENTS

| | | | |
|---|---|---|---|
| 2011/0135530 A1* | 6/2011 | Xu | B22F 3/172 |
| | | | 419/13 |
| 2012/0233929 A1* | 9/2012 | Baran, Jr. | C09C 1/3081 |
| | | | 51/308 |
| 2015/0068361 A1 | 3/2015 | Thomas et al. | |
| 2016/0002471 A1 | 1/2016 | Peng et al. | |
| 2016/0279704 A1* | 9/2016 | She | B23K 26/0006 |
| 2016/0339517 A1* | 11/2016 | Joshi | B22F 3/1055 |
| 2016/0339520 A1* | 11/2016 | Zhang | B23K 26/0006 |
| 2017/0274452 A1 | 9/2017 | Nagase et al. | |
| 2018/0214944 A1* | 8/2018 | Martin | B22F 9/06 |
| 2018/0214949 A1 | 8/2018 | Martin et al. | |
| 2018/0272426 A1 | 9/2018 | Martin et al. | |
| 2018/0339335 A1 | 11/2018 | Aixala et al. | |
| 2019/0032175 A1 | 1/2019 | Martin et al. | |
| 2019/0040503 A1 | 2/2019 | Martin et al. | |
| 2019/0106771 A1 | 4/2019 | Martin et al. | |
| 2019/0161835 A1 | 5/2019 | Martin et al. | |
| 2019/0161836 A1 | 5/2019 | Martin et al. | |
| 2019/0203325 A1 | 7/2019 | Martin et al. | |
| 2020/0024700 A1 | 1/2020 | Martin et al. | |
| 2021/0002744 A1 | 1/2021 | Martin et al. | |
| 2021/0008622 A1 | 1/2021 | Martin et al. | |

FOREIGN PATENT DOCUMENTS

| | | | |
|---|---|---|---|
| CN | 106001591 A | | 10/2016 |
| CN | 106756361 A | | 5/2017 |
| CN | 107234240 A | | 10/2017 |
| EP | 3 409 349 A1 | | 12/2018 |
| EP | 3 661 680 A1 | | 6/2020 |
| JP | 2016-41850 A | | 3/2016 |
| JP | 2017-025401 A | | 2/2017 |
| WO | WO 2017/015241 A1 | | 1/2017 |
| WO | WO 2017/177315 A1 | | 10/2017 |
| WO | WO 2019/027563 A1 | | 2/2019 |

OTHER PUBLICATIONS

Canadian Office Action, dated Feb. 5, 2020, in Canadian Patent Application No. 3,027,797.
European Office Action, dated Jan. 14, 2021, in European Patent Application No. 18 214 032.7.
Chinese Office Action, dated Oct. 21, 2020, in Chinese Application No. 201811590772.X and English Translation thereof.
Chinese Office Action, dated Apr. 19, 2021, in Chinese Application No. 201811590772.X and English Translation thereof.
Chinese Office Action, dated Aug. 10, 2021, in Chinese Patent Application No. 201811590772.X and English Translation thereof.
Japanese Information Offer, dated Aug. 31, 2021, in Japanese Patent Application No. 2017-248868 and English Translation thereof.
"Special Steel" "Latest trends of the manufacturing of a high quality spherical metal powder by using an inert gas atomization device" published by the Special Steel Association of Japan, vol. 65, No. 4 (Jul. 2016), p. 13, and partial English Translation thereof.
Takahisha Yamamoto "Fe based alloy powder, Ni based alloy powder and Co based alloy powder by using the centrifugal disc atomizing process" Sanyo Technical Report, vol. 23 (2016), No. 1, p. 27-p. 30. and English Translation thereof.

* cited by examiner

METAL POWDER MATERIAL

TECHNICAL FIELD

The present invention relates to a metal powder material. In more detail, the present invention relates to a metal powder material suitable for use in a layered manufacturing process in which a three-dimensional shaped article is manufactured by irradiation of energy beam such as laser beam.

BACKGROUND

In recent years, additive manufacturing (AM) is remarkably developing as new technology for manufacturing a three-dimensional shaped article. One of the additive manufacturing is a layered manufacturing process utilizing solidification of a powder material by energy beam irradiation. Two methods of a powder lamination-melting method and a powder deposition method are the representative method as the layered manufacturing process using a metal powder material.

Specific examples of the powder lamination-melting method include methods of selective laser-melting (SLM) and electron beam-melting (EBM). In those methods, a powder material containing a metal is supplied on a substrate as a base to form a powder bed, and energy beam such as laser beam or electron beam is irradiated on a predetermined position of the powder bed based on three-dimensional design data. As a result, the powder material of the region having received the irradiation solidifies through melting and resolidification and a shaped article is formed. Supply of the powder material to the powder bed and shaping by energy beam irradiation are repeated and a shaped article is sequentially laminated and formed in a layered shape, whereby a three-dimensional shaped article is obtained.

On the other hand, specific examples of the powder deposition method include a method of laser metal deposition (LMD). In this method, a metal powder is injected by using a nozzle to a position at which a three-dimensional shaped article is desired to be formed, and at the same time, laser beam irradiation is conducted, to thereby form the three-dimensional shaped article having a desired shape.

In manufacturing a three-dimensional shaped article made of a metal material by using the layered manufacturing process, a structure derived from heterogeneous distribution of a constituent material, such as voids and defects, may be formed in the three-dimensional shaped article to be obtained. The formation of the heterogeneous structure is desired to be suppressed as far as possible. For example, Patent Document 1 attempts to reduce defects due to the phenomenon caused in a molten pool in SLM method or the like, and Patent Document 1 proposes to vertically apply a static magnetic field to the surface of a metal powder layer in irradiating energy beam to the metal powder layer.

Patent Document 1: JP-A 2017-25401

SUMMARY

In the manufacturing of a three-dimensional shaped article by a layered manufacturing process using a metal material, the cause of generating the structure derived from heterogeneous distribution of constituent materials inside the three-dimensional shaped article is not limited only to the phenomenon generated when irradiating energy beam as described in Patent Document 1, but there are various factors. Of those, the state of the powder material before energy beam irradiation greatly affects the state of the three-dimensional shaped product to be obtained.

For example, in the powder lamination-melting method, a high homogeneity three-dimensional shaped article is easy to be obtained by smoothly supplying a powder material to a powder bed and stably forming the powder bed in which the powder metal is uniformly spread. Furthermore, the three-dimensional shaped article obtained by irradiating energy beam is more difficult to cause solidification shrinkage as the powder material is packed in higher density in the powder bed. Also in the powder deposition method, a three-dimensional shaped article can be stably formed by smoothly supplying the powder material without clogging a nozzle. Accordingly, it is important in layered manufacturing using a powder material as a raw material to control properties of the powder material to be used.

The present invention has been made to solve the above problems, and an object of the present invention is to provide a metal powder material suitable for use in the manufacturing of a three-dimensional shaped article by a layered manufacturing process.

To achieve the above object, the metal powder material according to the present invention contains: metal particles having a particle diameter d10 of 10 µm or more and 100 µm or less; and nanoparticles containing a metal or a metal compound, in which the particle diameter d10 is a particle diameter at which an under-sieve cumulative fraction in a mass base distribution of particle diameter reaches 10%, and in which the nanoparticles are adhered to or mixed with the metal particles.

The metal particles preferably have a circularity of 0.90 or more at an average particle diameter.

The nanoparticles are preferably adhered to the surface of the metal particles. In this case, at least a part of metal element(s) constituting the nanoparticles is preferably the same as at least a part of metal element(s) constituting the metal particles. Furthermore, the nanoparticles preferably contain a metal element that is easy to sublimate among the metal elements constituting the metal particles and the metal element is concentrated higher in the nanoparticles than in the metal particles. The nanoparticles and metal particles preferably contain aluminum.

The nanoparticles are preferably surface-modified with a hydrophobic group.

The metal particles are preferably composed any one of a titanium alloy, a nickel alloy, a cobalt alloy and an iron alloy.

The metal particles preferably have an internal part composed of a metal and a coating layer formed on the surface thereof, in which the coating layer contains a metal compound giving a Hamaker constant smaller than that of the metal in the internal part.

The metal powder material according to the present invention contains metal particles having a particle size of micron order and nanoparticles adhered to or mixed with the metal particles. Distance between the metal particles is maintained by interposing the nanoparticles between the metal particles. As a result, an attractive force mainly derived from Van der Waals force acting between the metal particles can be reduced.

As a result, the metal powder material can be suitably used in layered manufacturing. In other words, when forming a powder bed used in a powder lamination-melting method, the metal powder material can be stably supplied by reducing an attractive force acting between the metal particles to enhance fluidity of the metal powder material. In addition, the powder bed is easy to be formed to have a high homogeneity. Packing density in the powder bed is also easy to be increased. Even in the powder deposition method, since the metal powder material has a high fluidity, a nozzle is suppressed from clogging and a shaped article is easy to be stably formed.

In the case where the circularity of the metal particles is 0.90 or more in terms of an average particle diameter, the fluidity of the metal particles can be particularly increased. Furthermore, packing is easy to be conducted in high density.

In the case where the nanoparticles are adhered to the surface of the metal particles, the reduction of an attractive force between the metal particles is easy to be achieved stably and in high level.

In this case, according to the constitution that at least a part of the metal elements constituting the nanoparticles are the same as at least a part of the metal elements constituting the metal particles, the nanoparticles are easy to be formed on the surface of the metal particles using the metal particles themselves as a raw material. Even in the case where components derived from the nanoparticles remain in the three-dimensional shaped article manufactured by using the metal powder material, the components hardly generate any influence in the three-dimensional shaped article.

In the case where the nanoparticles contain a metal element that is easy to sublimate among the metal elements constituting the metal particles and the metal element is concentrated than in the metal particles, the metal element that is easy to sublimate is preferentially released from the metal particles by heating the metal particles, whereby the nanoparticles can be formed on the surface of the metal particles.

In the case where the nanoparticles and metal particles contain aluminum, since aluminum is a metal that is easy to sublimate, the nanoparticles containing aluminum are easy to be formed in the state of adhering to the surface of the metal particles by heating the aluminum-containing metal particles.

In the case where the nanoparticles are surface-modified with a hydrophobic group, when such nanoparticles are mixed with or adhered to the metal particles and are present in the vicinity of the metal particles, water is difficult to be adsorbed on the surface of the metal particles. As a result, an increase in attractive force between the metal particles due to a liquid bridge force through water is suppressed, and fluidity of the metal powder material is increased.

In the case where the metal particles are composed any one of a titanium alloy, a nickel alloy, a cobalt alloy and an iron alloy, the metal powder material can be suitably used as a raw material of a three-dimensional shaped article composed of those alloys, which have a large demand of the manufacturing utilizing a layered manufacturing process. Various additive elements including elements that are easy to sublimate, such as aluminum, can be contained in those alloys. Nanoparticles using the metal particles themselves as a raw material are easy to be formed to adhere to the surface of the metal particles.

In the case where the metal particles have an internal part composed of a metal and a coating layer on the surface thereof, and the coating layer contains a metal compound giving a Hamaker constant smaller than that of the metal in the internal part, Van der Waals force acting between the metal particles becomes small thanks to the presence of the coating layer as compared with the case where the metal is exposed on the surface. As a result, the metal powder material has particularly excellent fluidity. The coating layer can be formed through oxidation or nitration of the surface of the metal particles.

BRIEF DESCRIPTION OF DRAWINGS

FIG. 2A illustrates the case where nanoparticles are present on the surface of the metal particles, FIG. 2B illustrates the case of only the metal particles and FIG. 2C illustrates the case where water is present on the surface of the metal particles.

FIG. 3A shows the test result of a bulk density-standardized shear adhesive force ($\tau_s/\rho$) and FIG. 3B shows the evaluation result of a flow rate (FR).

FIG. 6A shows the state before the thermal plasma treatment and FIG. 6B shows the state after the thermal plasma treatment.

FIG. 7A shows the state before the thermal plasma treatment. FIG. 7B, FIG. 7C and FIG. 7D are the states after the thermal plasma treatment and the observation magnification is increased in this order.

FIG. 8A is a graph showing observation result of a region not containing nanoparticles, and FIG. 8B is a graph showing observation result of a region containing nanoparticles.

FIG. 9A shows the evaluation results of a bulk density-standardized shear adhesive force ($\tau_s/\rho$), FIG. 9B shows the evaluation results of an internal friction angle ($\phi$) and FIG. 9C shows the evaluation results of a bulk density ($\rho$).

EMBODIMENTS

A metal powder material according one embodiment of the present invention is described in detail below. The metal powder material according to one embodiment of the present invention can be used as a raw material for manufacturing a three-dimensional shaped article by irradiation of energy beam in a layered manufacturing process.

Properties Required in Powder Material for Layered Manufacturing

Properties required in powder materials used in a layered manufacturing process are described below. The present inventors have revealed as to what properties are important in powder materials in order to stably manufacturing a three-dimensional shaped article by a layered manufacturing process and to obtain a high quality three-dimensional shaped article.

In a powder lamination-melting method among the layered manufacturing process, such as SLM method or EBM method, as illustrated in FIG. 1, a powder material P is supplied by using a hopper 1 to spread on a substrate 2, thereby forming a powder bed. The powder bed obtained is irradiated with energy beam such as laser beam or electron beam with a predetermined pattern to cause melting and resolidification of the powder material P, whereby a shaped body A is prepared. The supply of the powder material P and the irradiation of energy beam are alternately repeated to laminate the shaped bodies A in layers. In this way, a three-dimensional shaped article can be manufactured.

Figure 1A:
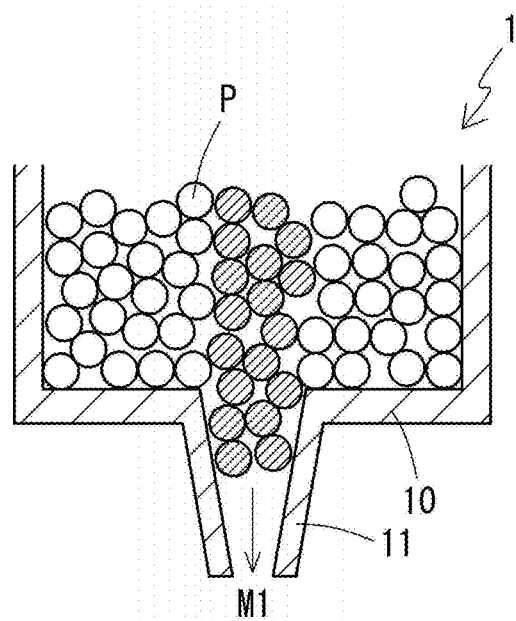
FIG. 1A and FIG. 1B are views for explaining drop of a powder material from a hopper, and the dropping of the powder material proceeds in the order of FIG. 1A and FIG. 1B.
Figure 1B:
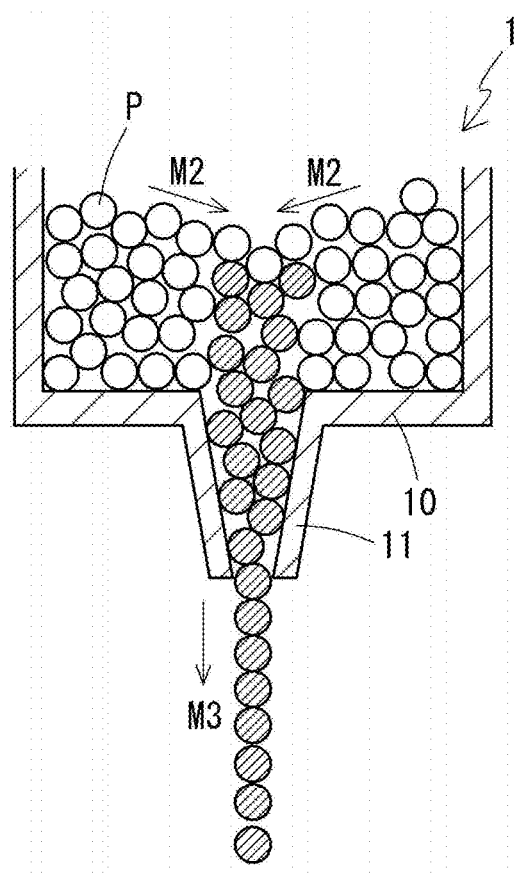

As illustrated in FIG. 1A and FIG. 1B, the hopper 1 supplying the powder material P has a cylindrical powder supply path 11 at the bottom of a container 10, and the powder material P filled in the container 10 is made to flow out from the powder supply path 11 by the gravity and supplied for the formation of a powder bed. In this case, stable outflow of the powder material P from the hopper 1 is important in stably forming a powder bed having high homogeneity.

A plurality of processes participates in the outflow of the powder material P from the hopper 1. In the initial stage of the outflow, the powder material P located just above the powder supply path 11 indicated by an oblique line drops toward the empty powder supply path 11 from the container 10 filled with the powder material P (movement M1) as illustrated in FIG. 1A. In this case, the initial supply of the powder material P can be stably achieved as the powder material P is easy to drop.

A value ($\tau_s/\rho$) obtained by dividing a shear adhesive force ($\tau_s$) between the particles of the powder material P by a bulk density ($\rho$) of the powder material P can be used as an index of easiness of drop of the powder material P. The shear adhesive force ($\tau_s$) is a force required to disperse aggregates of particles by shearing, and the adhesive force acting between the particles is large as the value is large. In the case where the shear adhesive force ($\tau_s$) is large, agglomeration occurs between the particles in the powder material P that starts to drop from the hopper 1, and the particles constituting the powder material P are difficult to drop from the hopper 1. The value ($\tau_s/\rho$) obtained by dividing the shear adhesive force ($\tau_s$) by the bulk density ($\rho$) is an amount in proportion to a limit discharge diameter that is the minimum hole diameter at which a powder can be discharged by its own weight. The powder is easy to flow out as the limit discharge diameter is small. The shear adhesive force ($\tau_s$) and bulk density ($\rho$) are functions of a powder pressure, but the present embodiment employs the hopper 1 having a funnel shape to discharge the powder material. Therefore, the powder pressure can be considered zero. Hereinafter, $\tau_s/\rho$ is referred to as a bulk density-standardized shear adhesive force.

Thus, the $\tau_s/\rho$ value is an index of easiness of drop of the powder material P and indicates that the powder material P is easy to drop as the value is small. The shear adhesive force ($\tau_s$) can be obtained, for example, as an intercept of a vertical axis, when a shear force ($\tau$) generated when a pressure ($\sigma$) is applied to the powder material P is measured, $\sigma$ is plotted in a horizontal axis and $\tau$ is plotted in a vertical axis ($\tau_s=\tau$ ($\sigma=0$)). The bulk density ($\rho$) is measured by using, for example, a conventional density measuring instrument. For example, the $\tau_s/\rho$ value is preferably 0.25 or less, more preferably 0.20 or less and still more preferably 0.15 or less, in terms of $(m/s)^2$.

When the powder material P located just above the powder supply path 11 drops in the hopper 1, space is generated in the region in which the powder material P dropped have occupied, as illustrated in FIG. 1B. As a result, the surrounding powder material P slides toward the space and fills in the space (movement M2). In this case, as the surrounding powder material P is easy to slide, the filling of the space and the subsequent drop of the powder material P stably proceed with high homogeneity. Internal friction angle ($\phi$) can be used as an index indicating easiness of slide of the powder material P.

The internal friction angle ($\phi$) is that proportionality coefficient of shear stress to the applied pressure, which the shear stress is generated in a direction intersecting a pressuring direction when a pressure is applied to the powder material P, is expressed as a friction angle. The aggregate of the powder material P is easy to disaggregate and easy to spread as the internal friction angle ($\phi$) is small. In other words, the powder material P is easy to slide to fill in the space formed in the hopper 1 as the internal friction angle ($\phi$) is small. The internal friction angle ($\phi$) can be obtained, for example, as an angle of an approximate straight line to a horizontal axis by measuring a shear force ($\tau$) generated when a pressure ($\sigma$) is applied to the powder material P, plotting $\sigma$ in a horizontal axis and plotting $\tau$ in a vertical axis (tan $\phi=\tau/\rho$), similar to the measurement of the shear adhesive force ($\tau_s$). The internal friction angle ($\phi$) is preferably 22° or less and more preferably 18° or less. An angle of repose can be used in place of the internal friction angle ($\phi$).

When the powder material P is supplied to the powder supply path 11 by the drop of the powder material P located just above the powder supply path 11 (movement M1) as illustrated in FIG. 1A and by the slide of the surrounding powder material P (movement M2) as illustrated in FIG. 1B, the powder material P passes through the powder supply path 11 and flows outside the hopper 1 (movement M3). In this case, fluidity of the powder material P is increased and the powder material P can be stably flown out as a flow rate (FR) of the powder material P is large. The flow rate (FR) of the powder material P is an amount having strong correlation with respect to the above-described bulk density-standardized shear adhesive force ($\tau_s/\rho$) and internal friction angle ($\phi$). The flow rate (FR) tends to increase as the bulk density-standardized shear adhesive force ($\tau_s/\rho$) and internal friction angle ($\phi$) are small. Evaluation of the actual flow rate (FR) of the powder material P can be used as an index of easiness of supply of the powder material P from the hopper 1. The flow rate (FR) can be measured as a fluidity according to JIS Z2502: 2012. The fluidity according to the above standard is preferably 30 seconds/50 g or less.

As described above, the fluidity is excellent as the bulk density-standardized shear adhesive force ($\tau_s/\rho$) is small, the internal friction angle ($\phi$) is small and the flow rate (FR) is large, in the powder material P. With an excellent fluidity, the powder material P can be supplied to the powder bed from the hopper 1 stably with high homogeneity. As a result, the powder bed can be stably formed in layered manufacturing by a powder lamination-melting method.

Figure 1C:
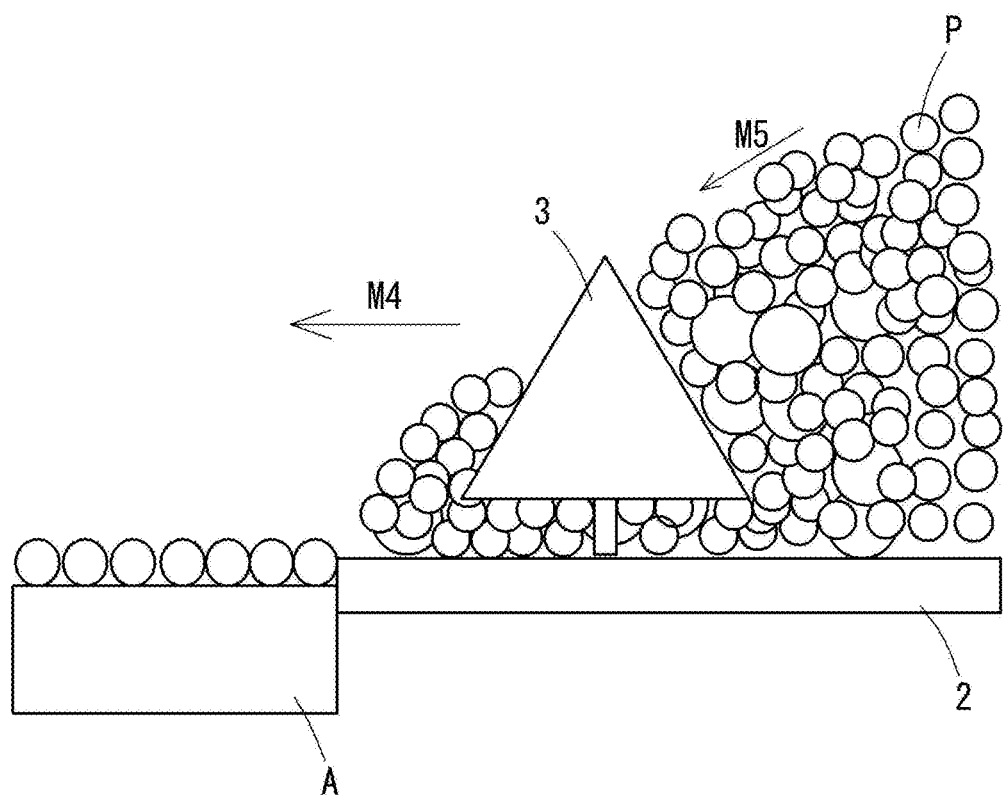
FIG. 1C is a view for explaining the spreading of the powder material.

The powder material P supplied on the substrate 2 from the hopper 1 is smoothed by a recoater (blade) 3 and made to spread on the substrate 2 and on an already-formed shaped body A as a lower layer, to thereby form a powder bed (see FIG. 1C). In this case, the recoater 3 is horizontally swept on the surface of the substrate 2 so as to spread out the powder material P dropped from the hopper 1 (movement M4), thereby homogenizing the distribution of the powder material P. In order to make easy to disperse the powder material P supplied on the substrate 2 or on the shaped body A from the hopper 1 or in order to make easy to spread out the powder material P by the recoater 3, the aggregate of the powder material P is preferably easy to disaggregate (movement M5). As described above, as the internal friction angle ($\phi$) is small, the powder material P is easy to disaggregate and the powder bed having high homogeneity is easy to be formed.

In the powder bed having the powder material P packed therein, as the powder material P is packed in a high density, a three-dimensional shaped article is easy to be formed homogeneously through the irradiation of energy beam. The reason for this is that when the powder material P melts and resolidifies by the irradiation of energy beam, the deformation due to solidification shrinkage and the defects due to the presence of a residual gas are difficult to be generated. The powder material P can be packed in a high density in the powder bed as the powder material P having a large bulk density ($\rho$) is used. The bulk density ($\rho$) is preferably 2.5 g/cm$^3$ or more. In the present specification, an apparent density (AD) is assumed as the bulk density, but a tap density (TD) may be used as an index of the bulk density. A packing ratio (%) showing the proportion of particles in bulk volume in a granular layer can be used as another index, and in this case, the packing ratio is preferably 55% or more.

As described above, the powder bed having high homogeneity can be formed from the powder material P supplied from the hopper 1 by using the powder material P having a small internal friction angle ($\phi$) and being easy to disaggregate. Furthermore, homogeneity of the three-dimensional shaped article manufactured can be enhanced by using the powder material P having a large bulk density ($\rho$). Accordingly, in addition to the effect of the use of the powder material P capable of being stably flown out in high homogeneity from the hopper 1, the process of the whole layered manufacturing can smoothly proceed in a stable manner in layered manufacturing by a powder lamination-melting method. Furthermore, a three-dimensional shaped article is easy to be obtained with a good quality.

Even in the layered manufacturing by a powder deposition method such as LMD method, the step of supplying the powder material P to a nozzle can be stably performed by using the powder material P having excellent fluidity as described above. In addition, even in the step of jetting the powder material P from the nozzle together with air stream toward a portion at which the shaping is performed, clogging of the nozzle is suppressed and the shaping can be stably proceeded.

Constitution of Metal Powder Material

Constitution of the metal powder material according to one embodiment of the present invention is described below as an example of the specific metal powder material having the above-described properties.

(1) Inclusion of Nanoparticles

The metal powder material according to one embodiment of the present invention contains metal particles and nanoparticles.

The metal particles are a constituent material of a three-dimensional shaped article and composed of a metal material having component composition desired in the three-dimensional shaped article. The kind of the material of the metal particles is not particularly limited, and preferred examples thereof include a titanium alloy, a nickel alloy, a cobalt alloy and an iron alloy. The reason for this is that there is a great demand of manufacturing a three-dimensional shaped article composed of those alloys as a raw material by a layered manufacturing process. In particular, a titanium alloy and a nickel alloy have a large demand for manufacturing a member having a special shape that is difficult to manufacture by other processing methods. Examples of the titanium alloy include Ti—Al alloys represented by Ti-6Al-4V alloy. Example of the nickel alloy includes INCONEL (registered trademark). Examples of the iron alloy include various tool steels.

The metal particles in the present embodiment have a particle diameter of micron order as in the metal particles generally used as a raw material in layered manufacturing. Specifically, a particle diameter d10 that is a particle diameter at which an under-sieve cumulative fraction in a mass base distribution of particle diameter of metal particles reaches 10% is 10 µm or more. The particle diameter d10 is preferably 30 µm or more from the standpoint of suitability as a raw material of layered manufacturing. The particle diameter d10 is preferably 100 µm or less.

The nanoparticles are particles having a particle diameter of nano-order and composed of a metal and/or a metal compound. The particle diameter of the nanoparticles is not particularly limited. Preferred examples of the particle diameter of the nanoparticles include 1 nm or more and 100 nm or less. The shape of the nanoparticles is not particularly limited and may be any shape such as a substantially spherical form, a polyhedral shape or an irregular shape.

The nanoparticles may be mixed in the metal powder material as an individual material separate from the metal particles and may be adhered to the metal particles. The embodiment that the nanoparticles are adhered to the metal particles indicates the state that an attractive force acting between the nanoparticles and the metal particles is larger than at least an attractive force acting between the mutual metal particles. The attractive force acting between the nanoparticles and the metal particles is preferably large in an extent such that the nanoparticles are not separated from the metal particles in handling the metal powder material up to the stage of the energy beam irradiation in layered manufacturing. It is more preferable that the nanoparticles are integrally joined to the surface of the metal particles, that is, the nanoparticles are bonded to the metal particles by a chemical bond (interatomic bond).

In the case where the metal powder material contains the nanoparticles in addition to the metal particles having a particle diameter of micron order, an attractive force acting between the metal particles can be reduced. The reduction in the attractive force between the metal particles can lead to a decrease in shear adhesive force ($\tau_s$) acting between the metal particles and an enhancement in easiness of disaggregation of the metal powder material. As a result, fluidity of the metal powder material can be enhanced. For example, the inclusion of the nanoparticles can make the shear adhesive force ($\tau_s$), acting between the metal particles, to be 50% or less of the case of containing no nanoparticle.

Figure 2A:
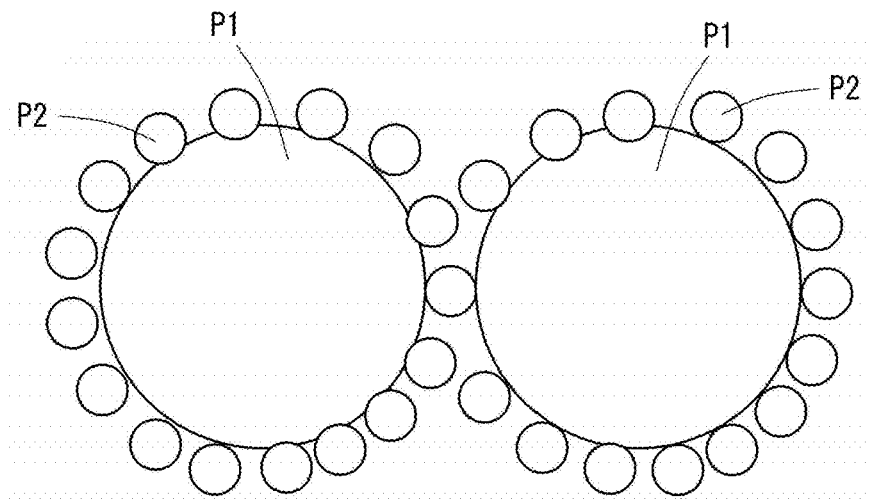
FIG. 2A, FIG. 2B and FIG. 2C are views for explaining an agglomeration state of metal particles.
Figure 2B:
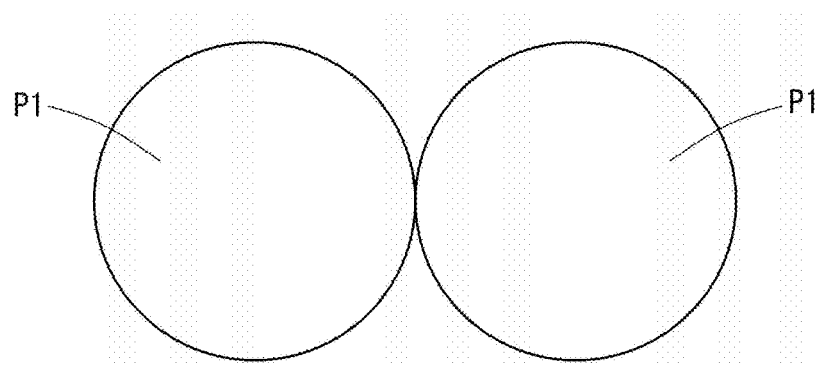

The reason why the attractive force acting between the metal particles is reduced by the inclusion of the nanoparticles is because a predetermined distance is maintained between the metal particles due to the interposition of the nanoparticles between the metal particles. In the case where the nanoparticles are not contained as illustrated in FIG. 2B, the metal particles P1 can mutually approach to each other up to the limit prescribed by a repulsive force acting between the mutual metal particles. On the other hand, in the case where the nanoparticles P2 are interposed between the metal particles P1 as illustrated in FIG. 2A, the metal particles P1 cannot mutually approach to each other shorter than the distance prescribed by a diameter of the nanoparticles P2 interposing. The attractive force acting between the metal particles, such as Van der Waals force or electrostatic attraction, is decreased as the distance between the metal particles is increased.

Particularly in the metal particles having a particle diameter in the order of from submicron to micron, Van der Waals fore is dominant as the attractive force between the particles. The Van der Waals force F between particles approximated to a sphere is expressed by the following formula (1).

$$F = \frac{H}{12d^2} \cdot \frac{D1 \cdot D2}{D1 + D2} \qquad (1)$$

In formula (1), D1 and D2 represent diameters of two particles, d represents a surface distance between particles and H represents Hamaker constant. In other words, when the distance between the metal particles is increased by the interposition of the nanoparticles, the attractive by Van der Waals force is decreased in inverse proportion to the square of the distance.

As described above, the nanoparticles may be mixed with the metal particles and may be adhered to the surface of the metal particles. However, particularly in the case where the nanoparticles are adhered to the surface of the metal particles, the nanoparticles are fixed to the surface of the metal particles and as a result, the effect of the reduction of Van der Waals force by securing the distance between the metal particles can be exhibited stably and in high level.

The kind of the metal or metal compound as a material constituting the nanoparticles is not particularly limited. However, the embodiment that at least a part of the metal element(s) constituting the nanoparticles is the same as at least a part of the metal element(s) constituting the metal particles is particularly preferred. In this case, the nanoparticles can be formed by using the metal particles themselves as a raw material. In particular, the nanoparticles are easy to be formed in the state of adhering to the surface of the metal particles. Furthermore, in the case where the metal element(s) composed of the nanoparticles is (are) the same as the metal element(s) contained in the metal particles that serve as a constituent material of a three-dimensional shaped article in layered manufacturing, a metal element other than the metal element(s) constituting the metal particles is not contained in the three-dimensional shaped article obtained and unnecessary impurities are difficult to be generated. Therefore, the embodiment is preferred in this point.

The metal nanoparticles composed of the metal element(s) constituting the metal particles can be formed in the state of adhering to the surface of the metal particles by heating the metal particles by using a thermal plasma or the like as described hereinafter. In the case of forming the nanoparticles by this method, the formation of the nanoparticles easily progresses in the case where the metal particles contain a metal element that is easy to sublimate by heating, such as Al, Mg, Cu or Sn. In this case, of metal element(s) contained in the metal particles, an element that is easy to sublimate is preferentially released from the metal particles and forms the nanoparticles on the surface of the metal particles. The nanoparticles thus formed are particles in which the metal element that is easy to sublimate is concentrated higher than in the metal particles. As for the titanium alloy, nickel alloy, cobalt and iron alloy exemplified above as examples of metal species constituting the metal particles, there are various conventional alloys containing a metal element that is easy to sublimate, such as Al.

In the case where the nanoparticles are a metal compound, the kind of the metal compound is not particularly limited. An inert metal compound such as a metal oxide or metal nitride is preferred from a view point that such an inert metal compound is difficult to provide impurities having large influence in the three-dimensional shaped article to be obtained. The metal element forming those compounds is preferably a light metal element such as Si, Al or Ti, in addition to the embodiment that at least a part of the metal element(s) of the metal compound is the same as at least a part of the metal element(s) contained in the metal particles, as described above. In particular, the nanoparticles of oxides of those elements (i.e., $SiO_2$, $Al_2O_3$ and $TiO_2$) have established production methods, are easily commercially available, and are hardly give a severe influence even though they are contained in a three-dimensional shaped article made of a metal.

As described above, the nanoparticles are mainly composed of a metal or metal compound, but may appropriately contain a component other than the metal and metal compound on the surface of and/or inside the nanoparticles of the metal or metal compound. Examples of such a component include organic molecules and organic functional groups, provided for the purpose of surface modification and/or surface protection, and organic residues derived from the production step of the nanoparticles or the like. Surface modification by an organic molecule or organic functional group can be positively utilized for the improvement of properties of the metal powder material.

For example, the embodiment that a hydrophobic group such as a hydrocarbon group such as a phenyl group is bonded to the surface of the metal oxide nanoparticles composed of $SiO_2$, $Al_2O_3$, $TiO_2$ or the like can be exemplified as a preferred example. As described hereinafter, when water is present on the surface of the metal particles, an attractive force between the metal particles increases due to the action of a liquid bridge force. However, the nanoparticles surface-modified with a hydrophobic group are interposed between the metal particles, water is difficult to be adsorbed on the surface of the metal particles. As a result, an adhesive force between the metal particles is reduced by the effect of reducing the liquid bridge force in addition to the effect of the interposition of the nanoparticles, and fluidity of the metal powder material can be enhanced.

The amount of the nanoparticles added can be set such that sufficient effect is exhibited to the reduction of the adhesive force between the metal particles depending on its addition embodiment, component composition, particle diameter and the like. For example, as demonstrated in Examples described hereinafter, in the case where $SiO_2$ nanoparticles having a particle diameter of from about 10 nm to 100 nm are mixed with the metal particles, sufficient effect of reducing the adhesive force can be obtained by the addition of the nanoparticles in an amount of about 0.01 mass % on the basis of the mass of the metal particles. It is preferred to determine the upper limit of the addition amount at which the effect by the addition saturates, from the standpoint of avoiding excessive addition. The upper limit can be empirically estimated and may be 8/d/L when the metal particles have a density of d ($g/cm^3$) and a minimum particle diameter of L (μm). In the case where the metal particles are a titanium alloy having the minimum particle diameter of 25 μm, the upper limit value is approximately 0.07 mass %. The d10 diameter may be used in place of the minimum particle diameter. On the other hand, in the case of forming the metal nanoparticles adhered to the surface of the metal particles by using the metal particles themselves as a raw material, the nanoparticles may be formed so as to occupy 10% or more of the surface area of the metal particles.

(2) Shape of Metal Particles

The shape of the metal particles constituting the metal powder material greatly affects fluidity and packing properties of the metal powder material. In the case where the metal particles have a shape having a high symmetry close to a sphere, the internal friction angle ($\phi$) in the metal powder material is decreased by the effect of the shape. The reduction in the internal friction angle ($\phi$) in the metal powder material may lead to improvements in easiness of disaggregation of the aggregate of the metal powder and in fluidity of the metal powder material. As a result, in layered manufacturing, the metal powder material can be made to stably flow out of the hopper or the like and additionally the metal powder material is easy to be spread as a powder bed. Furthermore, in the case where the metal particles have a shape close to a sphere, the metal particles can be densely packed by the effect of the shape, and a bulk density ($\rho$) of the metal powder material is increased. As a result, a dense powder bed can be formed, which can lead to an improvement in quality of a three-dimensional shaped article.

From the standpoint of sufficiently obtaining the above-mentioned effects, the circularity of the metal particles is preferably 0.90 or more in terms of an average particle diameter (d50), that is, in the metal particles having a particle diameter equal to the average particle diameter. The circularity is more preferably 0.95 or more and still more preferably 0.97 or more. The circularity of the metal particles is an index indicating proximity to a true circle in a two-dimensional shape (projected figure) obtained by projecting a three-dimensional shape of the metal particle to a plane.

The circularity of the metal particles can be calculated as (circumferential length of virtual circle having the same area as projected figure)/(overall length of contour of projected figure). In the case where the metal particle is a true sphere, that is, when the projected figure is a true circle, the circularity is 1. Analysis of the circularity can be conducted based on an image obtained by a microscope such as an optical microscope or a scanning electron microscope (SEM). The circularity is preferably obtained as an average value of statistically sufficient number of the metal particles in the metal particles having a particle diameter that can be considered to be sufficiently close to an average particle diameter. For example, a particle diameter within a range of ±5 μm centering an average diameter is considered to be a particle diameter sufficiently close to the average particle diameter, the circularity of the metal particles having such a particle diameter is analyzed, and its average value is used for evaluation. In the case where the metal particles aggregate with each other by an attractive force, the circularity is evaluated as the whole aggregate (secondary particle). In the optical microscope and the SEM, the presence of the nanoparticles does not substantially affect the measurement of the circularity of the metal particles. Therefore, even in the case where the nanoparticles are adhered to the metal particles, the circularity can be evaluated as they are.

A plurality of methods is considerable as a method for increasing the circularity of the metal particles. As described above, in the case where the metal particles aggregate, the circularity as the whole aggregate is decreased, and easiness of disaggregation and packing properties of the powder material are also decreased. Therefore, elimination of aggregation of the metal particles leads to an improvement in the circularity. Specifically, the attractive force acting between the metal particles decreases by containing the nanoparticles in the metal powder material as described above, and this leads to the improvement in the circularity of the metal particles. Also when the metal particles are heated by a thermal plasma treatment or the like as described hereinafter, aggregation between the metal particles can be eliminated. Removal of aggregate having a large diameter by classification is also effective to the improvement in the circularity.

For example, heating of the metal particles by a thermal plasma treatment or the like as described hereinafter can be exemplified as a method for increasing the circularity of the metal particles themselves (primary particles). This method not only can eliminate the aggregation of the metal particles but also can improve the circularity of the primary particles. Other example of the method for improving the circularity of the metal particles themselves includes mechanical disaggregation using jet mill or the like.

Increasing the circularity of the metal particles also contributes to an improvement of fluidity of the metal powder material through the reduction of the amount of water adsorbed, in addition to the effect of the largeness of the circularity. The reason for this is because a specific surface area of the metal particles is decreased as the circularity is large, and thus, an area on which water can adsorb is relatively decreased. As a result, the attractive force acting between the metal particles due to a liquid bridge through water can be reduced and the shear adhesive force ($\tau_s$) between the metal particles can be reduced.

(3) Material Constituting Surface of Metal Particles

The material constituting the surface of the metal particles greatly affects fluidity of the metal powder material. As described above, the shear adhesive force ($\tau_s$) increases and the fluidity of the metal powder material decreases as Van der Waals force acting between the metal particles increases, and the degree of Van der Waals force greatly depends on the material constituting the particles. In detail, Van der Waals force acting between particles increases as Hamaker constant H increases in the above-mentioned formula (1). Hamaker constant H is determined by the material constituting the particles.

Then, from the viewpoint of reducing Van der Waals force acting between the metal particles, a coating layer containing a metal compound giving a Hamaker constant H smaller than that of a metal in the internal region of the metal particles composed of the metal is provided on the surface of the internal region of the metal particles. Examples of the metal compound include metal oxides and metal nitrides.

The metal compound constituting the coating layer may be a compound of the same metal element as the metal element constituting the internal region and may be a compound of different metal element from that constituting the internal region. However, from the standpoint of simple and easy formation of the coating layer and the standpoint of suppression of the influence of the coating layer to a three-dimensional shaped article to be obtained, the coating layer is preferably contain a metal compound of the same metal element as the metal element constituting the internal region. In particular, in the case where the coating layer is composed of an oxide or a nitride of the same metal element as the metal element constituting the internal region, the coating layer can be simply and easily formed by oxidizing or nitriding the surface of the metal particles. In the case where the nanoparticles to be mixed with or adhered to the metal particles are composed of a metal compound, the metal compound constituting the coating layer of the metal particles may be the same as or different from the metal compound constituting the nanoparticles.

In the case where the coating layer containing a metal oxide or a metal nitride is provided on the surface of the metal particles, the coating layer can contribute to a decrease in the shear adhesive fore ($\tau_s$) acting between the particles and an increase in fluidity of the metal particles, not only through the effect of decreasing Van der Waals force by decreasing Hamaker constant but also through the effect of reducing the influence of liquid bridge by water. The metal oxide and metal nitride have activity lower than that of the corresponding metal and are difficult to adsorb a water molecule and a hydroxyl group on the surface. As a result, the amount of water present on the surface of the metal particles is decreased and a liquid bridge force is decreased.

(4) Amount of Water on surface of Metal Particles

Figure 2C:
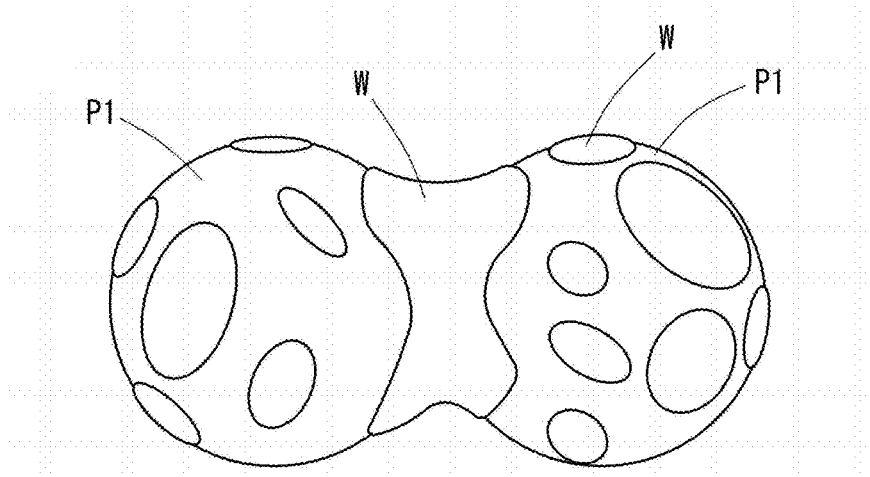

In the case where water (adsorbed water) is present on the surface of the metal particles, the adjacent metal particles P1 are in the state of being bridged through water W as illustrated in FIG. 2C and strong attractive force, that is, liquid bridge force, acts between the metal particles P1. Such a cohesion between the metal particles due to the liquid bridge force leads to an increase of the shear adhesive fore ($\tau_s$). For this reason, the amount of water present on the surface of the metal particles is preferably decreased as far as possible from the standpoint of reducing the shear adhesive fore ($\tau_s$) between the metal particles and increasing fluidity of the metal powder material.

The reduction of the amount of water on the surface of the metal particles can be achieved by drying the metal powder material in the state just before the use in layered manufacturing by, for example, dehumidification of the atmosphere storing the metal powder material or heating of the metal powder material.

Furthermore, the amount of water on the surface of the metal particles can also be reduced by increasing the circularity of the metal particles, providing on the surface of the metal particles the coating layer containing a metal compound having an activity lower than that of the metal, such as a metal oxide or a metal nitride, or modifying the nanoparticles with a hydrophobic group.

Production Method of Metal Powder Material

A method for producing a metal powder material containing metal particles having a particle diameter of micron order and nanoparticles, according to the embodiment of the present invention, will be described below.

Hereunder, one example of a method for producing a metal powder material having a constitution that metal nanoparticles composed of the same metal element(s) as at least a part of metal element(s) constituting metal particles are adhered to the surface of the metal particles is described. At first, metal particles having a particle diameter of micron order to which nanoparticles are not adhered are produced. The metal particles can be preferably produced by an atomizing method. Various atomizing methods such as a gas atomizing method and a disk atomizing method can be used, but a gas atomizing method is particularly preferred.

The metal particles obtained are heated and nanoparticles are made to generate on the surface thereof. At this time, the heating is preferably conducted by means of a thermal plasma treatment. In the thermal plasma treatment, the metal particles are made to pass through thermal plasma. The metal particles after passing are rapidly cooled.

When the metal particles are sufficiently heated by thermal plasma or the like, at least the microstructure in the vicinity of the surface of the metal particles is melted or sublimated. When the material melted or sublimated is rapidly cooled and solidified on the surface of the metal particles, nanoparticles may be formed on the surface of the metal particles. Particularly in the case where a metal element that is easy to sublimate as compared with other component metal elements, such as Al are contained in the component composition of the metal particles, the metal that is easy to sublimate or an alloy in which the metal that is easy to sublimate is concentrated higher than in the component composition of the original metal particles preferentially sublimates from the metal particles and easily resolidifies on the surface of the metal particles to form the nanoparticles on the surface of the metal particles. In this case, the nanoparticles are composed of the metal that is easy to sublimate or an alloy in which the metal is concentrated higher than in the component composition of the original metal particles. The nanoparticles are adhered to the surface of the metal particles.

Heating of the metal particles by means of a thermal plasma treatment or the like can generate the nanoparticles in the state of being adhered to the surface of the metal particles and at the same time, can increase circularity of the metal particles. The metal particles just obtained by an atomizing method may be aggregated, but the aggregation can be eliminated by heating. This can increase circularity of the metal particles. In addition, at least the microstructure in the vicinity of the surface of the metal particles is melted or sublimated by heating, and the metal particles undergo spheroidizing and smoothing in the course of resolidification. This can further improve the circularity of the metal particles. In other words, the metal particles come into the state that the metal nanoparticles is adhered to the smooth surface of the metal particles having a shape close to a sphere having high circularity by passing through the heating such as a thermal plasma treatment. The circularity of the metal particles can be preferably improved by heating to 1.1 times or more as compared with the circularity before heating.

The metal particles may be appropriately subjected to classification after the production of the metal particles by an atomizing method or the like and/or after the heat treatment by a thermal plasma treatment or the like. The method for producing a metal powder material having a constitution that metal nanoparticles composed of the same metal element(s) as at least a part of metal element(s) constituting metal particles are adhered to the surface of the metal particles is described above. However, the production method is not limited to this production method and any production method according to the inclusion state and component composition of the metal nanoparticles is appropriately used. For example, in the case where nanoparticles containing a metal element different from that of metal particles are mixed with the metal particles, the nanoparticles are separately produced by a liquid phase method, a gas phase method or the like and are added to the metal particles, followed by sufficiently mixing the resulting mixture.

Example

The present invention will be described in detail below by reference to Examples.

(1) Effect of Inclusion of Nanoparticles

The changes in properties such as fluidity of a metal powder material by the inclusion of nanoparticles in the metal powder material were examined.

Preparation of Sample

Metal particles made of Ti-6Al-4V alloy (alloy containing 6 mass % of Al and 4 mass % of V, with the balance being Ti and unavoidable impurities; Ti-64) were prepared by a gas atomizing method. The metal particles were subjected to classification of 15/45 μm to prepare Sample A1.

SiO$_2$ nanoparticles having an average particle diameter of 10 nm whose surface is modified with a phenyl group ("YA010C-SP3" manufactured by Admatechs) were mixed with Sample A1 to obtain Sample A2.

Evaluation of Properties

Bulk density-standardized shear adhesive force ($\tau_s/\rho$) and flow rate (FR) of Sample A1 and Sample A2 were evaluated. The evaluations were conducted under the conditions of temperature: 23° C. and relative humidity RH: 26% (hereinafter the same).

In measuring the shear adhesive force ($\tau_s$), shear stress ($\tau$) generated when a pressure ($\sigma$) was applied to a powder material was measured by using a rotary cell type shearing test device according to JIS Z8835: 2016. Then, a was plotted in the horizontal axis and τ was plotted in the vertical axis, and the shear adhesive force ($\tau_s$) was obtained as a vertical axis intercept of the approximate straight line. The bulk density ($\rho$) was measured by using a bulk density measuring meter for a metal powder according to JIS Z2504: 2012. The flow rate (FR) was measured as a fluidity according to JIS Z2502: 2012.

The amount of the nanoparticles added was changed in a range of from 0.01 mass % to 0.50 mass % and the shear adhesive force ($\tau_s$) was measured respectively.

Evaluation Results

Figure 3A:
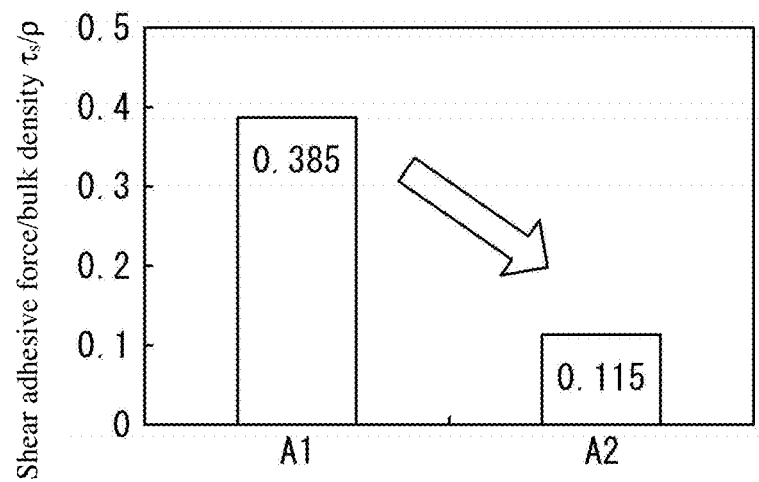
FIG. 3A and FIG. 3B are graphs showing the test results of the addition effect of nanoparticles.
Figure 3B:
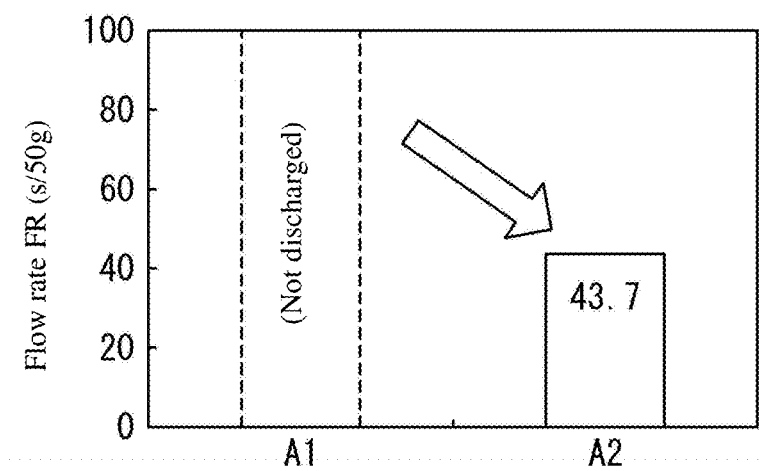

The evaluation results of the bulk density-standardized shear adhesive force ($\tau_s/\rho$) and flow rate (FR) of Sample A1 (without nanoparticles) and Sample A2 (with nanoparticles) are shown in FIG. 3A and FIG. 3B. The unit of $\tau_s/\rho$ in the drawings is (m/s)$^2$ (hereinafter the same).

According to FIG. 3A, the $\tau_s/\rho$ value was decreased to about 30% by the addition of the nanoparticles. This fact indicates that the adhesive force between the particles is reduced by the addition of the nanoparticles.

As shown in FIG. 3B, in the case where the nanoparticles were not added, the metal powder material was not discharged well from a funnel for measurement, and fluidity could not be measured. In the case where the nanoparticles were added, the metal powder material was smoothly discharged, and small measurement value, that is, large flow rate (FR), was obtained by adding the nanoparticles. In other words, easiness of disaggregation of the metal powder material is improved by addition of the nanoparticles, thereby increasing fluidity, and as a result, when the powder material is made to flow out or to spread in the respective steps of layered manufacturing, the stability of those steps can be enhanced.

Figure 4:
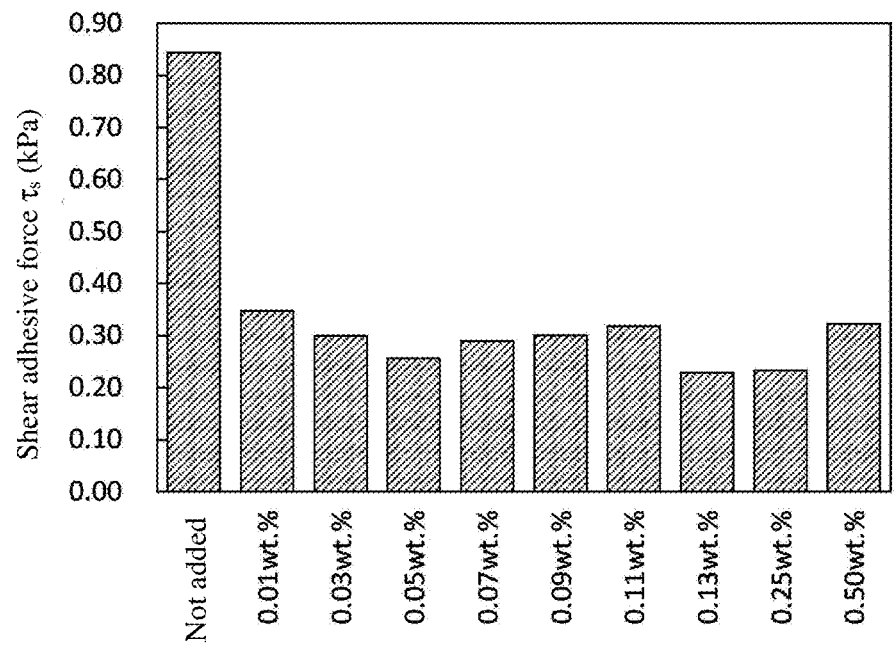
FIG. 4 is a graph showing the test results of the relationship between an amount of the nanoparticles added and a shear adhesive force.

The results of the shear adhesive force ($\tau_s$) measured by changing the amount of the nanoparticles added are shown in FIG. 4. According to the graph shown in FIG. 4, the shear adhesive force ($\tau_s$) was decreased to about 40% by merely adding the nanoparticles in a slight amount of 0.01 mass %. Even though the amount of the nanoparticles added was increased than that, the shear adhesive force ($\tau_s$) did not decrease systematically. This fact indicates that the amount of 0.01 mass % is sufficient as the amount of the nanoparticles added from the standpoint of the reduction of the shear adhesive force ($\tau_s$) of the metal particles. Even small amount of the nanoparticles added has a great effect in the reduction of the shear adhesive force ($\tau_s$).

(2) State and Properties of Metal Particles after Thermal Plasma Treatment

The changes in state and properties of metal particles when the metal particles were subjected to a thermal plasma treatment were examined.

Preparation of Sample

Metal particles made of Ti-64 alloy were prepared by a gas atomizing method. The metal particles were subjected to classification of 45/75 μm to prepare Sample B1.

Metal particles similarly prepared by a gas atomizing method were subjected to a thermal plasma treatment. The metal particles were then subjected to classification of 45/75 μm to prepare Sample B2.

Evaluation of State and Properties of Metal Particles

Particle shape of Sample B1 and Sample B2 was evaluated by using a particle image analyzer. Particle size distribution was evaluated based on the particle shape, and circularity was measured every particle diameter of 10 μm.

In addition, Sample B1 and Sample B2 were observed by using a scanning electron microscope (SEM). Depth distribution of element concentration was analyzed by Auger electron spectroscopy (AES) using SEM.

Bulk density-standardized shear adhesive force ($\tau_s/\rho$), internal friction angle ($\phi$) and bulk density ($\rho$) of Sample B1 and Sample B2 were evaluated. The bulk density-standardized shear adhesive force ($\tau_s/\rho$) and bulk density ($\rho$) were measured in the same manners as in the test (1) above. The internal friction angle ($\phi$) was calculated by using the plotted graph used for the measurement of the shear adhesive force ($\tau_s$) in which a was plotted in the horizontal axis and τ was plotted in the vertical axis, and the inclination of the approximate straight line was calculated as tan $\phi$.

Evaluation Results

State of Metal Particles

Figure 5:
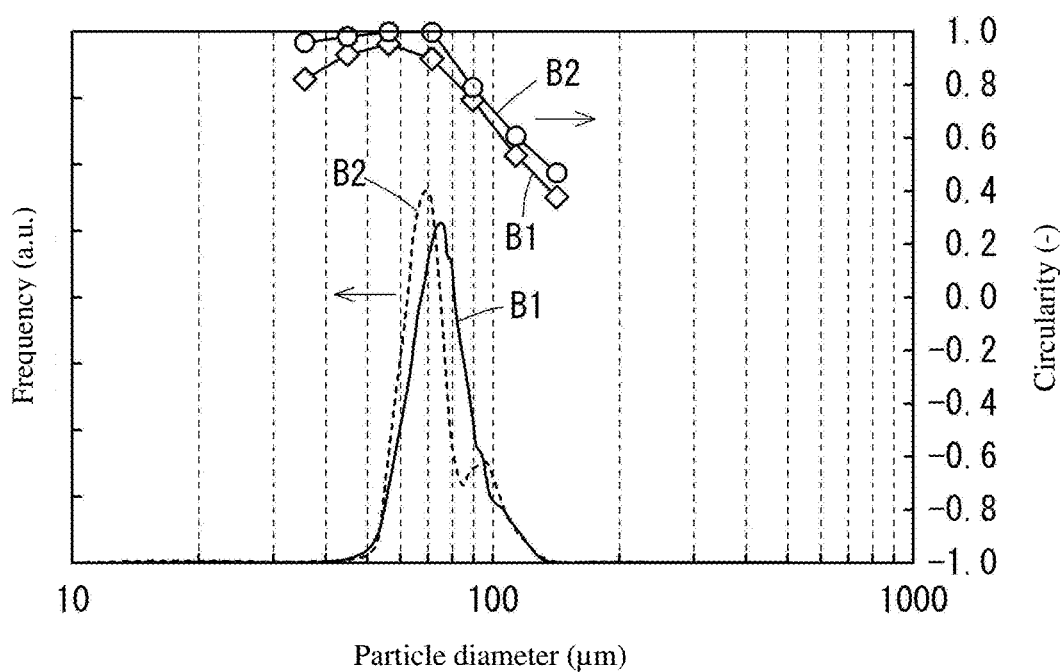
FIG. 5 is a graph showing the test results of particle size distribution and circularity of the metal particles before (B1) and after (B2) a thermal plasma treatment.

The particle size distributions of Sample B1 (before thermal plasma treatment) and Sample B2 (after thermal plasma treatment) are shown in FIG. 5 (indicated by a solid line and a broken line, respectively). According to the graph, Sample B1 and Sample B2 had similar particle size distribution in its central value and width. Parameters relating to the particle size distribution are shown in Table 1 below. Each parameter shows close value between Sample B1 and Sample B2. Accordingly, Sample B1 and Sample B2 achieved the desired particle size distribution through the classification, and it is confirmed that the differences in state and properties appeared between Sample B1 and Sample B2 in the following evaluations were not due to the difference of the particle size distribution.

TABLE 1

| | Particle size (μm) | | |
| --- | --- | --- | --- |
| | d10 | d50 | d90 |
| Sample B1 | 61 | 74 | 95 |
| Sample B2 | 59 | 70 | 98 |

Figure 6A:
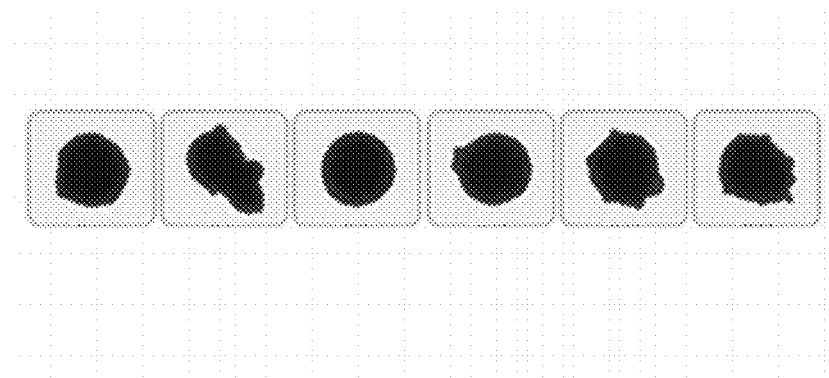
FIG. 6A and FIG. 6B are particle images for evaluation of particle shape in the case of a particle diameter of 70 μm.
Figure 6B:
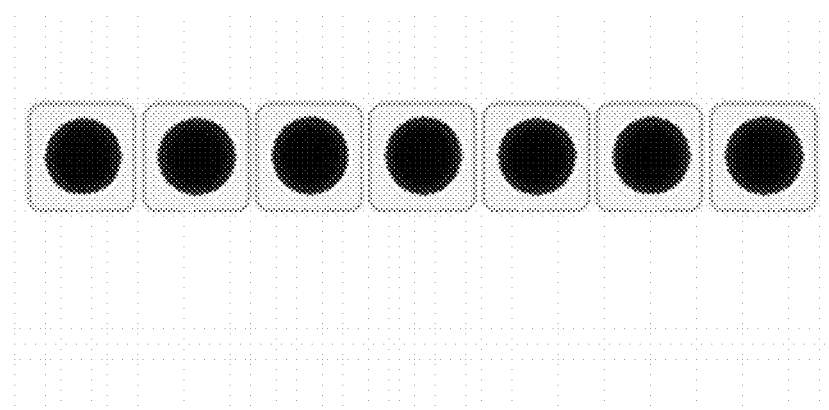

Examples of images of the particles obtained in the case of a particle size of 70±5 μm that corresponds to an average particle diameter of Sample B1 are shown in FIG. 6A and FIG. 6B. FIG. 6A shows the observation results of Sample B1 and FIG. 6B shows the observation results of Sample B2. It can be seen from those images that almost all of the particles in Sample B1 had a distorted shape deviated from a circle, whereas almost all of the particles in Sample B2 had a shape fairly close to a circle.

Circularities of the metal particles were calculated based on those particle images of FIG. 6 and those values were averaged. As a result, the average value in Sample B1 was 0.89. On the other hand, the average value in Sample B2 was 0.99 and the numerical value of nearly 1 was obtained.

Circularities of other particle diameters were evaluated every particle diameter of 10 µm in the same manner as the evaluation of the circularity corresponding to a particle diameter of 70 µm based in the particle images of FIG. 6. The evaluation results are shown in FIG. 5 (indicated by plotted points and straight lines) together with the particle size distribution. According to FIG. 5, the circularity of Sample B2 was higher than that of Sample B1 in all particle diameters. This tendency was particularly remarkable at a small diameter side.

It is understood from the above evaluation results that remarkably high circularity was obtained in Sample B2 having passed through the thermal plasma treatment and metal particles having a shape close to a sphere were obtained, as compared with Sample B1 having been subjected to only the classification. In other words, it can be found that the circularity of the metal particles can be increased by a thermal plasma treatment to obtain the metal particles having a shape close to a sphere.

Figure 7A:
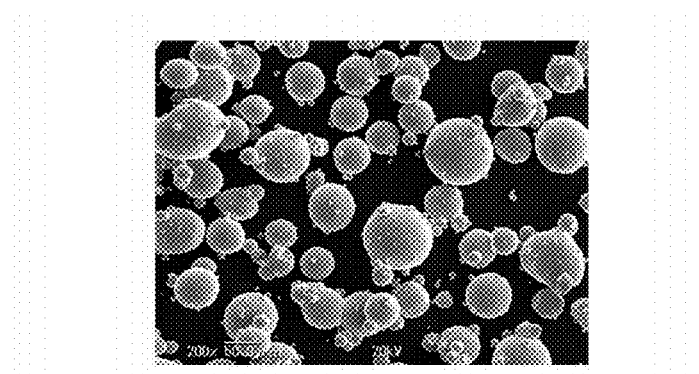
FIG. 7A, FIG. 7B, FIG. 7C, and FIG. 7D are SEM images of metal particles.

The results of SEM observation of the metal particles are shown in FIG. 7A, FIG. 7B, FIG. 7C, and FIG. 7D. FIG. 7A shows the particles of Sample B1. It can be seen that many small particles having a diameter of about 10 µm or less were adhered to the surface of large particles having a diameter of several tens µm. Large particles having a distorted shape were also seen. The aggregate of the large particles and the small particles corresponds to a distorted particle image having a low circularity as shown in FIG. 6A.

Figure 7B:
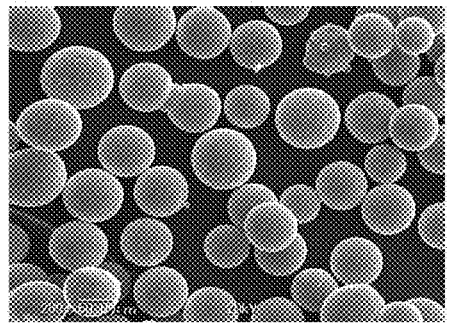

On the other hand, though FIG. 7B shows the particles of Sample B2 in the same magnification as in FIG. 7A, such an aggregate of large particles having a diameter of several tens µm with small particles having a smaller diameter adhered to the surface thereof was not substantially seen in FIG. 7B. Furthermore, each particle was observed in a shape close to a sphere, and particles having a distorted shape were hardly seen.

Figure 7C:
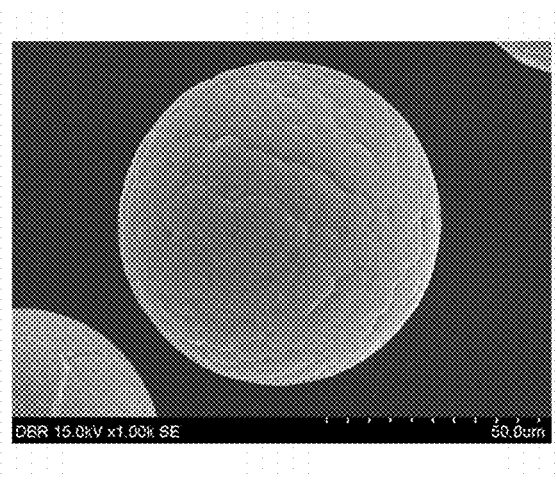

High magnification image of the particle of Sample B2 is shown in FIG. 7C. It can be confirmed from the image that the particle had a shape that can be considered to be almost sphere. Furthermore, the particle had a surface having high smoothness.

Figure 7D:
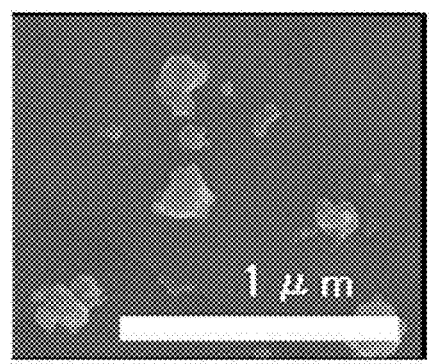

The image observing the surface of the particle shown in FIG. 7C in higher magnification is shown in FIG. 7D. In the image, the background area observed dark corresponds to the smooth surface of the nearly spherical metal particle. A plurality light areas are observed in a granular shape in a size of nano-order in the dark area. Those light areas correspond to the nanoparticles adhered to the surface of the metal particles.

Figure 8A:
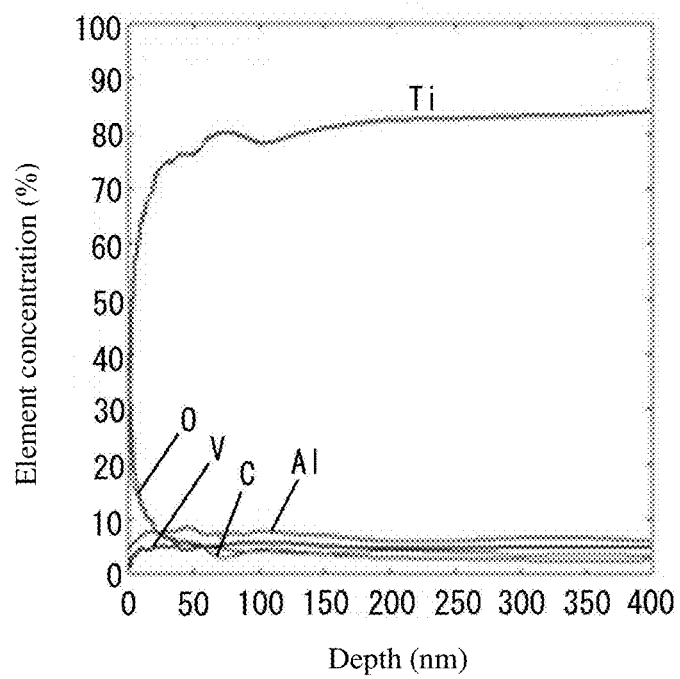
FIG. 8A and FIG. 8B are graphs showing the results of Auger electron spectroscopy to the surface of metal particles after the thermal plasma treatment.
Figure 8B:
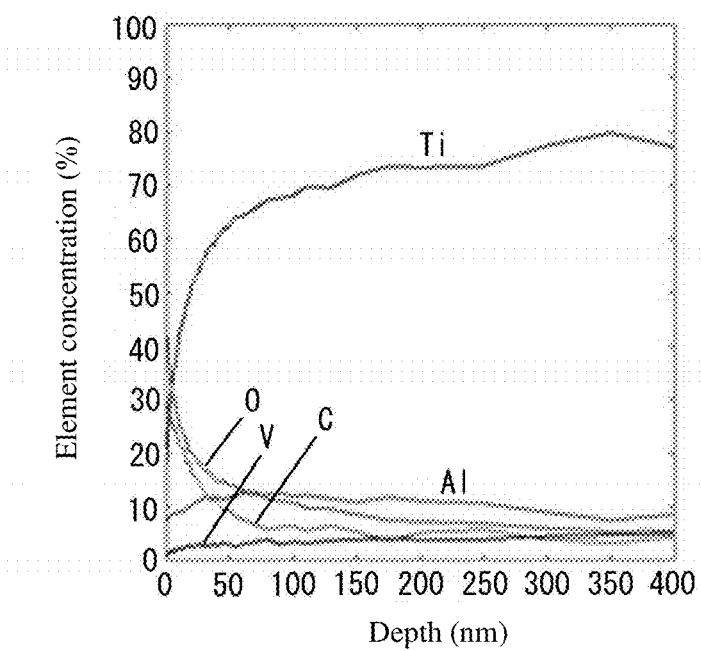

The measurement results of AES to micro-area on the surface of the particle of Sample B2 are shown in FIG. 8A and FIG. 8B. FIG. 8A shows the measurement results corresponding to the area not containing nanoparticles observed light on the surface of the metal particles observed in FIG. 7D. On the other hand, FIG. 8B shows the measurement results corresponding to the area containing the nanoparticles.

In the comparison between FIG. 8A and FIG. 8B in the distribution of element concentration, Ti, V, Al, O and C were distributed in each distribution. However, the Al concentration in the area containing the nanoparticles in FIG. 8B was higher than that in the area not containing the nanoparticles in FIG. 8A. Similarly, the O concentration in the area containing the nanoparticles was also higher than that in the area not containing the nanoparticles. Those tendencies were particularly remarkable in the area having small depth. It is understood from the results that Al was concentrated and additionally underwent oxidation in the nanoparticles formed to adhere to the surface of the metal particles, as compared with the internal part of the metal particles.

It is understood from the above-discussed results of SEM and AES that in Sample B2, the circularity of the metal particles was increased and additionally the nanoparticles were formed to adhere to the surface of the metal particles, through the thermal plasma treatment. Furthermore, the nanoparticles contained the same component elements as the metal particles, but Al was concentrated in the nanoparticles than in the metal particles. Those results indicate that when the metal particles receive heating through a thermal plasma treatment, the surface thereof once melts or sublimates and then resolidifies, thereby increasing the circularity of the metal particles and additionally, the nanoparticles are formed on the surface of the metal particles in the process. In the process of the formation of the nanoparticles, Al is particularly easy to sublimate among the metal elements contained in the metal particles is preferentially released from the surface of the metal particles and concentrated into the nanoparticles.

Properties of Metal Powder Material

Figure 9A:
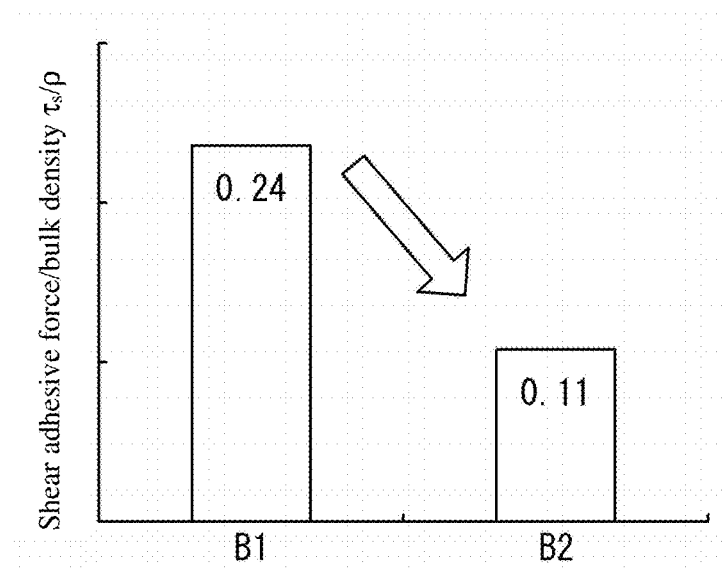
FIG. 9A, FIG. 9B and FIG. 9C are graphs showing the test results of the effect of the thermal plasma treatment.

The measurement results of the bulk density-standardized shear adhesive force ($\tau_s/\rho$) are shown in FIG. 9A. According to the graph, the $\tau_s/\rho$ value of Sample B2 having passed through the thermal plasma treatment was decreased to 50% or less as compared with Sample B1 having passed through only the classification.

Figure 9B:
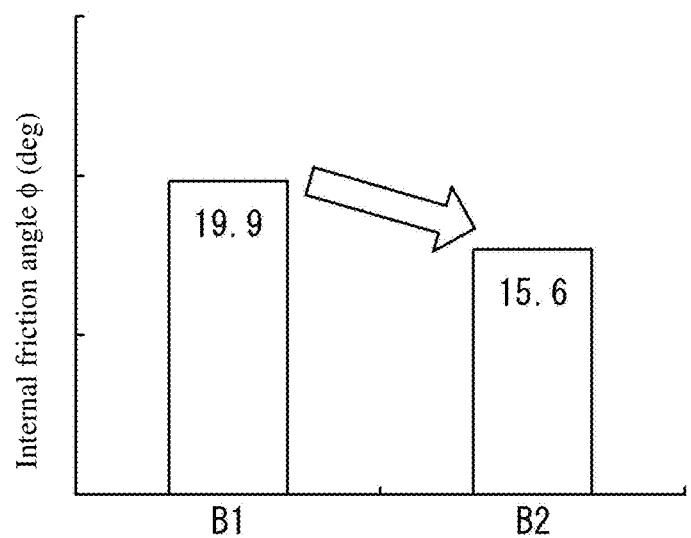

The measurement results of the internal friction angle ($\phi$) are shown in FIG. 9B. According to the graph, the internal friction angle ($\phi$) of Sample B2 having passed through the thermal plasma treatment was decreased to 80% or less in terms of tan $\phi$ as compared with Sample B1 having passed through only the classification.

Figure 9C:
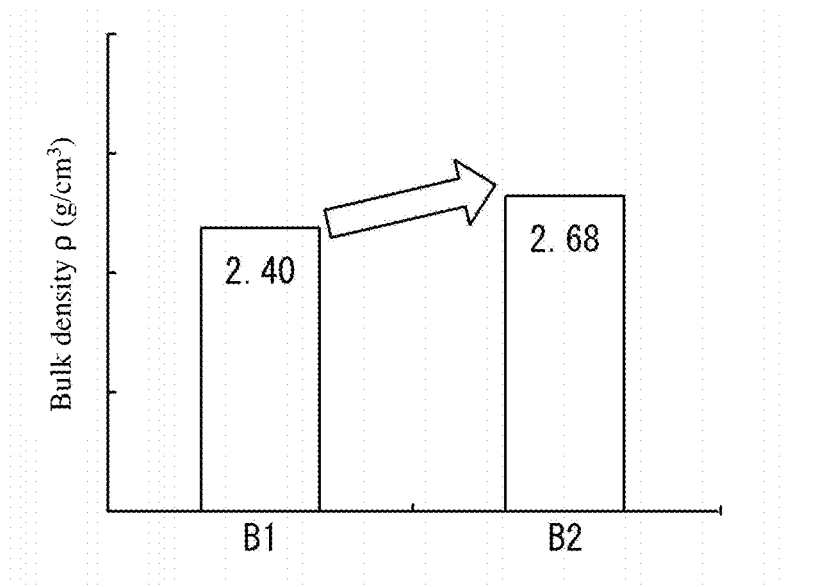

The measurement results of the bulk density ($\rho$) are shown in FIG. 9C. According to the graph, the bulk density ($\rho$) of Sample B2 having passed through the thermal plasma treatment was increased to 1.1 times or more as compared with Sample B1 having passed through only the classification.

As described above, when the metal particles are subjected to the thermal plasma treatment, the bulk density-standardized shear adhesive force ($\tau_s/\rho$) and internal friction angle ($\rho$) of the metal powder material were decreased and the bulk density ($\rho$) thereof was increased. Those are due to the effects of the improvement in the circularity of the metal particles and the formation of the nanoparticles on the surface of the metal particles. In particular, it is considered that the decrease of the bulk density-standardized shear adhesive force ($\tau_s/\rho$) greatly receives the influence of the reduction of Van der Waals force due to the formation of the nanoparticles.

(3) Influence of Amount of Water

The influence of the amount of water on a surface of metal particles on adhesive force between the metal particles was examined.

Preparation of Sample

Metal particles made of Ti-64 alloy were prepared by a gas atomizing method. The metal particles were subjected to classification of 45/105 µm to prepare a sample.

Evaluation of Properties

The change in the shear adhesive force ($\tau_s$) was compared by changing a relative water vapor pressure. Specifically, the sample obtained above was maintained in the atmosphere having a relative water vapor pressure controlled to a predetermined value, and the shear adhesive force ($\tau_s$) was measured. The shear adhesive force ($\tau_s$) was measured in the same manner as in the tests (1) and (2) above.

Evaluation Results

Figure 10:
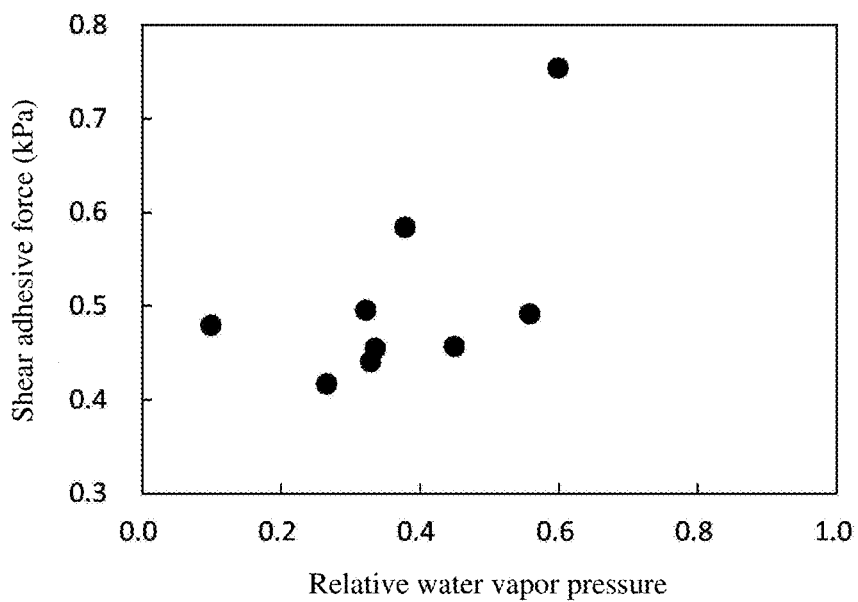
FIG. 10 is a graph showing the test results of the relationship between a shear adhesive force between metal particles and a relative water vapor pressure.

The measurement results of the shear adhesive force ($\tau_s$) by changing the relative water vapor pressure are shown in FIG. 10. Although the data scattered depending on as to whether the adsorption of water molecules on the surface of the metal particles sufficiently reached the equilibrium before measurements, it can be seen that the shear adhesive force ($\tau_s$) tended to increase as the relative water vapor pressure increased.

The results indicate that the shear adhesive force ($\tau_s$) between the particles increases as the amount of water present on the surface of the metal particles increases. This can be interpreted to be due to water bridge between the particles. It can be said from this fact that the fluidity of the powder material can be increased by decreasing the amount of water present on the surface of the metal particles and reducing an attractive force between molecules.

The embodiments and Examples of the present invention are described above. The present invention is not particularly limited to those embodiments and Examples, and various modifications can be made. Furthermore, in the above embodiments, the nanoparticles are contained in the metal powder material together with the metal particles having a particle diameter of micron order, and in such a case, the metal powder material could be formed into a material suitable as a material of layered manufacturing through the increase in the circularity of the metal particle and decrease in the amount of water on the surface of the metal particles.

The present application is based on Japanese Patent Application No. 2017-248868 filed on Dec. 26, 2017, which contents are incorporated herein by reference.

REFERENCE SIGNS LIST

1 Hopper
10 Container
11 Powder supply path
2 Substrate
3 Recoater
A Shaped body
P Powder material
P1 Metal particles
P2 Nanoparticles
W water

The invention claimed is:

1. A metal powder material, comprising:
   metal particles leaving a particle diameter d10 of 10 μm or more and 100 μm or less; and
   nanoparticles comprising a metal or a metal compound,
   wherein the particle diameter d10 is a particle diameter at which an under-sieve cumulative fraction in a mass base distribution of particle diameter reaches 10%,
   wherein the nanoparticles are adhered to or mixed with the metal particles,
   wherein the nanoparticles are surface-modified with a hydrophobic group,
   wherein the metal particles have an internal part composed of a metal and a coating layer formed on a surface thereof, and
   wherein the coating layer comprises a metal compound giving a Hamaker constant smaller than that of the metal in the internal part.

2. The metal powder material according to claim 1, wherein the metal particles have a circularity of 0.90 or more at an average particle diameter.

3. The metal powder material according to claim 1, wherein the nanoparticles are adhered to a surface of the metal particles.

4. The metal powder material according to claim 3, wherein at least a part of metal element(s) constituting the nanoparticles is the same as at least a part of metal element(s) constituting the metal particles.

5. The metal powder material according to claim 4, wherein the nanoparticles comprise a metal element that is easiest to sublimate among the metal elements constituting the metal particles and the metal element is present in a higher concentration in the nanoparticles than in the metal particles.

6. The metal powder material according to claim 4, wherein the nanoparticles and the metal particles comprise aluminum.

7. The metal powder material according to claim 1, wherein the metal particles are composed of one of a titanium alloy, a nickel alloy, a cobalt alloy, and an iron alloy.

8. The metal powder material according to claim 1, wherein the nanoparticles have a particle diameter of 1 nm or more and 100 nm or less.

9. The metal powder material according to claim 1, wherein the nanoparticles comprise aluminum.

10. The metal powder material according to claim 1, wherein the metal particles comprise aluminum.

11. The metal powder material according to claim 1, wherein the nanoparticles and the metal particles comprise aluminum.

12. The metal powder material according to claim 1, wherein the nanoparticles comprise the metal.

13. The metal powder material according to claim 1, wherein the nanoparticles comprise the metal compound.

14. The metal powder material according to claim 1, wherein the hydrophobic group comprises a phenyl group.

15. A method for producing a three-dimensionally shaped article, comprising irradiating the metal powder material as defined in claim 1 with an energy beam.

16. A metal powder material, comprising:
    metal particles having a particle diameter d10 of 10 μm or more and 100 μm or less; and
    nanoparticles comprising a metal or a metal compound,
    wherein the particle diameter d10 is a particle diameter at which an under-sieve cumulative fraction in a mass base distribution of particle diameter reaches 10%,
    wherein the nanoparticles are adhered to or mixed with the metal particles, wherein the nanoparticles are surface-modified with a hydrophobic group, and
    wherein the metal particles have an internal part including a metal and a coating layer formed on a surface of the metal particles.

17. A metal powder material, comprising:
    metal particles having a particle diameter d10 of 10 μm or more and 100 μm or less; and
    nanoparticles comprising a metal or a metal compound,
    wherein the particle diameter d10 is a particle diameter at which an under-sieve cumulative fraction in a mass base distribution of particle diameter reaches 10%,
    wherein the nanoparticles are adhered to a surface of the metal particles, and
    wherein the nanoparticles and the metal particles comprise aluminum.

* * * * *